(12) United States Patent
Eskamani et al.

(10) Patent No.: US 10,524,491 B2
(45) Date of Patent: Jan. 7, 2020

(54) COATED PACKAGING PRODUCTS, SYSTEMS AND METHODS

(71) Applicant: Flavorseal, LLC, Avon, OH (US)

(72) Inventors: A. Gus Eskamani, Hudson, OH (US); Melanie Dorenkott, Westlake, OH (US); Tiffani A. Sutton-Gilbert, Cleveland, OH (US); Michael Kaminski, Elyria, OH (US); Michael A. Pintz, Fairview Park, OH (US); Ed Nolan, Medina, OH (US)

(73) Assignee: Flavorseal LLC, Avon, OH (US)

( * ) Notice: Subject to any disclaimer, the term of this patent is extended or adjusted under 35 U.S.C. 154(b) by 0 days.

(21) Appl. No.: 15/808,110

(22) Filed: Nov. 9, 2017

(65) Prior Publication Data
US 2018/0064145 A1    Mar. 8, 2018

Related U.S. Application Data (62) Division of application No. 15/270,463, filed on Sep. 20, 2016, now abandoned.
(Continued)

(51) Int. Cl.
*A23L 3/10* (2006.01)
*B05D 1/02* (2006.01)

(52) U.S. Cl.
CPC .............. *A23L 3/10* (2013.01); *B05D 1/02* (2013.01); *A23V 2002/00* (2013.01)

(58) Field of Classification Search
CPC .............. A23G 3/2023; B65D 81/2038; B65D 81/3272; B65D 81/3461; B65D 81/28;
(Continued)

(56) References Cited

U.S. PATENT DOCUMENTS 2,902,371 A    9/1959 Morris
3,042,532 A    7/1962 Daline
(Continued)

FOREIGN PATENT DOCUMENTS

CA    2135416    5/1996
WO    2011034674 A1    3/2011

OTHER PUBLICATIONS

Search Report and Written Opinion for International Application No. PCT/US2016/052619 dated Feb. 23, 2017.
(Continued)

*Primary Examiner* — Alex A Rolland
(74) *Attorney, Agent, or Firm* — Calfee, Halter & Griswold, LLP (57) ABSTRACT

In a method of forming a coated bag for pre-treating an item stored in the bag, a bag is provided, having a sidewall extending from a closed bottom end to an open top end and defining an interior surface of a cavity. The bag is expanded from a flattened condition to an expanded condition. At least one adhesive dispenser is inserted through the open top end of the bag into the cavity. An adhesive is applied from the at least one inserted adhesive dispenser to form an adhesive coating on the interior surface of the cavity. A particulate dispenser is inserted through the open top end of the bag into the cavity. A particulate is discharged from the inserted particulate dispenser to embed the particulate in the adhesive coating. The adhesive coating is dried to retain the embedded particulate on the interior surface of the sidewall.

21 Claims, 7 Drawing Sheets

Related U.S. Application Data (60) Provisional application No. 62/221,172, filed on Sep. 21, 2015.

(58) Field of Classification Search
CPC ....... Y02A 40/961; A21C 15/005; A21C 9/04; B05D 1/12
See application file for complete search history.

(56) References Cited

U.S. PATENT DOCUMENTS

| | | | |
|---|---|---|---|
| 3,596,428 A | 8/1971 | Charles et al. | |
| 3,821,436 A | 6/1974 | Fry | |
| 4,260,637 A | 4/1981 | Rispoli | |
| 4,356,202 A | 10/1982 | Todd | |
| 4,396,039 A | 8/1983 | Kleng | |
| 4,446,167 A | 5/1984 | Smith et al. | |
| 4,496,601 A | 1/1985 | Rispoli | |
| 4,599,822 A * | 7/1986 | Baker | A01M 23/005 |
| | | | 43/114 |
| 4,756,422 A | 7/1988 | Kristen | |
| 5,328,705 A | 7/1994 | Wilhoit | |
| 5,431,343 A * | 7/1995 | Kubiak | B05B 7/066 |
| | | | 239/105 |
| 5,639,523 A | 6/1997 | Ellis | |
| 5,705,214 A | 1/1998 | Ito et al. | |
| 5,741,533 A | 4/1998 | Moore et al. | |
| 5,858,426 A | 1/1999 | Bienvenu | |
| 5,863,578 A | 1/1999 | Guarino | |
| 5,914,142 A | 6/1999 | Zartner | |
| 6,117,464 A | 9/2000 | Moore et al. | |
| 6,153,232 A | 11/2000 | Holten et al. | |
| 6,299,917 B1 | 10/2001 | Appleby | |
| 6,444,246 B1 | 9/2002 | Popplewell | |
| 6,623,773 B2 | 9/2003 | Meier et al. | |
| 6,667,082 B2 | 12/2003 | Bamore et al. | |
| 6,884,446 B1 | 4/2005 | Underwood et al. | |
| 7,282,229 B2 | 10/2007 | Underwood et al. | |
| 10,155,612 B2 | 12/2018 | Carroll | |
| 2002/0001670 A1* | 1/2002 | Pauw | H01L 21/288 |
| | | | 438/113 |
| 2003/0031765 A1 | 2/2003 | Luthra et al. | |
| 2003/0054075 A1 | 3/2003 | Dinh-Sybeldon et al. | |
| 2004/0007494 A1 | 1/2004 | Popeil et al. | |
| 2005/0147330 A1 | 7/2005 | Lee | |
| 2005/0163894 A1 | 7/2005 | Underwood et al. | |
| 2005/0247960 A1 | 11/2005 | Rim et al. | |
| 2005/0286817 A1 | 12/2005 | Hall et al. | |
| 2006/0051465 A1 | 3/2006 | Kyle et al. | |
| 2006/0127538 A1 | 6/2006 | Appleby | |
| 2006/0159806 A1 | 7/2006 | Darin et al. | |
| 2006/0172096 A1 | 8/2006 | Kyle et al. | |
| 2006/0189466 A1* | 8/2006 | Tsutsui | B31B 1/00 |
| | | | 493/206 |
| 2006/0198960 A1 | 9/2006 | Calvert et al. | |
| 2007/0126129 A1* | 6/2007 | Ahn | C09J 7/381 |
| | | | 257/783 |
| 2007/0191956 A1* | 8/2007 | Prewett | A61F 2/442 |
| | | | 623/17.16 |
| 2008/0190999 A1 | 8/2008 | Tomasini et al. | |
| 2008/0199592 A1 | 8/2008 | Fexer | |
| 2008/0264821 A1 | 10/2008 | Liang | |
| 2009/0030361 A1 | 1/2009 | Bach | |
| 2009/0110787 A1 | 4/2009 | Kyle et al. | |
| 2009/0274799 A1 | 11/2009 | Lee et al. | |
| 2011/0262603 A1* | 10/2011 | Blattner | B65B 25/001 |
| | | | 426/323 |
| 2012/0128836 A1 | 5/2012 | Carroll | |
| 2014/0220287 A1* | 8/2014 | Jokinen | B32B 37/12 |
| | | | 428/41.8 |
| 2017/0094995 A1 | 4/2017 | Eskamani | |

OTHER PUBLICATIONS

"Wetting: The Physics Behind Wetting," Apr. 15, 2012, adhesives. org. <http://www.adhesives-selants/science-of-adhesion/wetting>, Accessed Jun. 13, 2017.

Robertson, Gordon L., "Food Packaging Principles and Practive," Taylor and Francis, 3rd Eitions, pp. 152-157.

Final Office Action for U.S. Appl. No. 15/270,463 dated Nov. 29, 2017.

Response to Jul. 10, 2017 Office Action for U.S. Appl. No. 15/270,463 dated Nov. 2, 2017.

Office Action for U.S. Appl. No. 15/270,463 dated Jul. 10, 2017.
Office Action for U.S. Appl. No. 16/185,237 dated Mar. 5, 2019.

* cited by examiner

COATED PACKAGING PRODUCTS, SYSTEMS AND METHODS

CROSS-REFERENCE TO RELATED APPLICATION

This application is a divisional of U.S. Non-Provisional patent application Ser. No. 15/270,463 filed on Sep. 20, 2016, which claims priority to and all benefit of U.S. Provisional Patent Application Ser. No. 62/221,172, filed on Sep. 21, 2015, for COATED PACKAGING PRODUCTS, SYSTEMS AND METHODS, the entire disclosures of which are fully incorporated herein by reference.

TECHNICAL FIELD

The present application relates generally to packaging containers and other item retaining substrates for treating items with an additive material.

BACKGROUND

Items that are packaged and stored for later use are often treated with an additive material to enhance, preserve, or otherwise modify the item for eventual sale or use as the modified item. In some embodiments, the additive material is deposited in a packaging container (e.g., storage bag or processing bag) with the item to be stored, such that over time or upon initiation of an item treating process, the additive material coats, penetrates, is absorbed by, or otherwise treats the stored item. In many cases, the deposited additive material (e.g., a liquid, powder, or gel) tends to pool or collect at the bottom of the container, resulting in a disproportionately large portion of the additive material being applied to a lower portion of the stored item, and a disproportionately small portion of the additive material being applied to an upper portion of the stored item. While this uneven treatment of the item may in some applications be reduced by filling the storage container with a larger amount of the additive material, this may result in the use of excess additive material within the storage container, with the excess material being discarded with the packaging (and not being applied to the stored item) upon removal and use of the item.

SUMMARY

The present application contemplates packaging products, systems, and methods in which an additive material is adhered to an interior surface of a packaging container prior to receiving an item to be placed or stored in the packaging container.

Accordingly, in an exemplary embodiment of the present application, a method of forming a coated bag for treating an item stored in the bag is contemplated. In the exemplary method, a bag having a sidewall extending from a closed bottom end to an open top end is provided, with the bottom end and the sidewall having an interior surface together defining an interior surface of a cavity. The bag is changed from a flattened condition to an expanded condition in which the sidewall defines a perimeter. At least one adhesive dispenser is inserted through the open top end of the bag into the cavity. An adhesive from the at least one inserted adhesive dispenser is applied to form an adhesive coating on the interior surface of the cavity. A particulate dispenser is inserted through the open top end of the bag into the cavity. A particulate is discharged from the inserted particulate dispenser to embed the particulate in the adhesive coating. The adhesive coating is dried to retain the embedded particulate on the interior surface of the sidewall.

In another exemplary embodiment of the present application, a spray-coated bag for treating an item to be retained therein includes a heat-shrinkable film, a sprayed adhesive coating, and a particulate. The heat-shrinkable film forms a sidewall extending from a closed bottom end to an open top end, with the bottom end and the sidewall having an interior surface together defining an interior surface of a cavity. The adhesive coating is adhered to the interior surface of the cavity, and the particulate is embedded in the adhesive coating.

In another exemplary embodiment of the present application, a method of pretreating an item is contemplated. In the exemplary method, a spray-coated bag is provided, the bag including a heat-shrinkable film forming a sidewall extending from a closed bottom end to an open top end, with the bottom end and sidewall having an interior surface together defining an interior surface of a cavity, an adhesive coating adhered to the interior surface of the cavity; and a particulate or additive embedded in the adhesive coating. The item is received in the bag cavity, and the open top end of the bag is sealed to enclose the item in the bag cavity. The bag is heated to an orientation temperature to shrink the bag into surrounding contact with an exterior surface of the enclosed item. The enclosed item is maintained in the shrunk bag for a period of time sufficient to release the embedded particulate or additive from the adhesive coating, such that the released particulate is applied substantially uniformly to the exterior surface of the enclosed item.

BRIEF DESCRIPTION OF THE DRAWINGS

Further features and advantages of the invention will become apparent from the following detailed description made with reference to the accompanying drawings, wherein.

DETAILED DESCRIPTION

This Detailed Description merely describes exemplary embodiments and is not intended to limit the scope of the claims in any way. Indeed, the invention as claimed is broader than and unlimited by the exemplary embodiments, and the terms used in the claims have their ordinary meaning. For example, many of the specific exemplary embodiments of packaging products, systems, and methods described herein involve heat-shrinkable food storage bags that are coated with an edible adhesive (e.g., a sugar-based carbohydrate glue) sprayed on an interior surface of the bag and a seasoning particulate discharged into the bag and embedded in the adhesive coating, and heat dried to form a solid, dry seasoning coating, with the coating being configured to allow for release of the seasoning particulate onto the stored foodstuff after the bag has shrunk into surrounding contact with a moist exterior surface of the stored foodstuff, which facilitates dissolution of the adhesive and release of the seasoning particulate. In other inventive embodiments contemplated by the present application, one or more of the inventive aspects of the present application may additionally or alternatively utilize other types of packaging products, contained items, adhesives, particulates, non-particulate additives (e.g., liquids or gels), drying or curing methods, and additive release methods, independently or in combination, as described in greater detail below.

Figure 1:
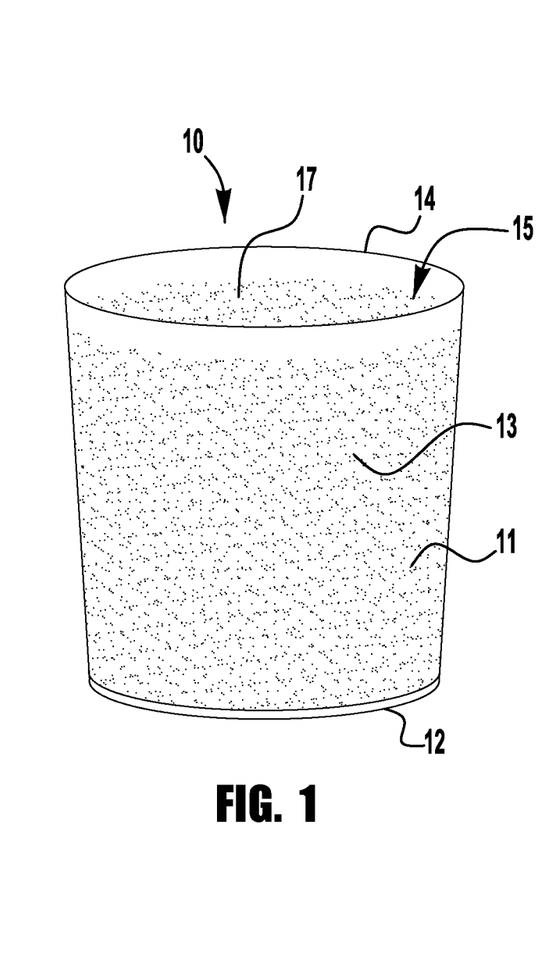
FIG. 1 is a schematic view of an exemplary coated bag in accordance with an exemplary embodiment of the present application.

Referring to FIG. 1, a coated bag in accordance with certain aspects of the present application is shown generally at 10. The exemplary bag 10 includes a film 11 forming a closed bottom end 12 and a sidewall 13 extending from the bottom end to an open top end 14. The bottom end 12 and sidewall 13 together define an interior surface of a bag cavity 15 in which an item may be received.

The bag may be provided in a wide range of shapes, including, for example, round bottomed, square bottomed, cylindrical, conical, gusseted, seamed, and seamless, and in a wide range of sizes, including but not limited to, for example, bags having a length between approximately 10 inches and approximately 36 inches and a width between approximately 5 inches and approximately 14 inches.

Figure 2:
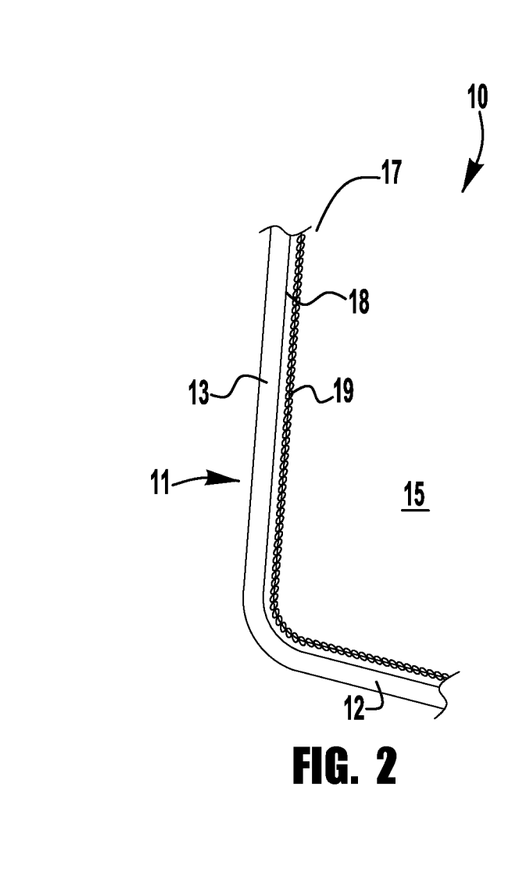
FIG. 2 is a schematic enlarged partial cross-sectional view of the coated bag of FIG. 1.

As shown in the enlarged partial cross-sectional view of FIG. 2, a coating 17 is adhered to the interior surface of the bag cavity 15 of the exemplary bag 10. As described herein, the coating may include one or more additives for treating, enhancing, or modifying an item contained in the bag, as described in greater detail below. In the exemplary embodiment, as shown in the enlarged cross-sectional view of FIG. 2, the coating 17 includes an adhesive layer 18 and a solid particulate 19 embedded in the adhesive layer. In other embodiments, the coating may include only an adhesive layer (without any embedded particulate), with the adhesive layer including one or more additive materials (e.g., liquids, gels, or particles small enough to be suspended in the adhesive layer). As used herein, "adhesive material," "adhesive coating," and "adhesive layer" are intended to include not only materials, coatings, and layers that adhere another material (e.g., a solid particulate) to a substrate to which the material, coating, or layer is adhered, but also materials, coatings, and layers that are themselves adhered to the substrate without providing adhesion to any other materials.

A wide variety of suitable container coating adhesives may be utilized in various exemplary embodiments of the present application, including, for example, any suitable edible or inedible adhesives. Examples of edible adhesive include heat soluble adhesives, adhesives soluble in a variety of solvents (e.g., water, fat, alcohol, etc.), permanent adhesives, lipids (e.g., lards, oils), oleoresin, gelatin, fiber-based adhesives (e.g., plant extract, biopolymer), slurries, sugar alcohol, syrups (e.g., corn syrup, flavored syrup, caramelized syrup, etc.), and gums (e.g., arabic, carrageenan, etc.). In one exemplary embodiment, a sugar-based carbohydrate glue is used as an edible adhesive for coating the interior surface of a bag and retaining edible particulate embedded in the adhesive layer.

The particulate embedded in or otherwise adhered with the adhesive layer may vary in type, amount, and size. The size of the particulate, such as seasoning applied to coated food packaging, will vary depending on the type of additive to be applied to the stored item, and may be in granule form. For example, a seasoning such as crushed red pepper flakes may range in granule size from 10 mesh to 30 mesh. Other exemplary seasonings may range in granule size from about 5 mesh to about 100 mesh. In one embodiment, about 95% of the seasonings used in the seasoning layer has a granule size that is larger than about 80 mesh, and about 5% of the seasoning has a granule size that is larger than about 8 mesh. In another embodiment, about 20% of the seasoning used in the seasoning layer has a granule size that is smaller than about 100 mesh, about 75% of the seasoning has a granule size that is larger than about 80 mesh, and about 5% of the seasoning has a granule size that is larger than about 8 mesh.

A wide variety of suitable item-treating particulates may be utilized in various exemplary embodiments of the present application, including, for example, any suitable edible or inedible particulates. Examples of edible particulates include seasonings, spices, colorants, preservatives, nut products, cheeses, real or imitation meat particles (e.g., bacon bits), breading (e.g., panko), cornmeal, antimicrobial materials, curing agents, whey, powder supplements (e.g., vitamins, minerals, proteins, fiber, caffeine, and herbal supplements, such as ginseng), acidulants, cocoa powder, coffee, dried food particles (e.g., vegetables, fruits), nutraceuticals, probiotics, deodorizers, fragrances, and powdered alcohol. In non-food based embodiments, exemplary inedible particulates may include, for example, dessicants, rust inhibitors, anti-UV additives, paint, and sand. In medical applications, medical supplement additives may be utilized, such as, for example, antibiotics and analgesics.

The ratio of applied adhesive (e.g., edible adhesive) to particulate (e.g., seasoning) also varies depending on the type and amount of particulate that is to be applied to the interior of the bag. In one embodiment, the amount of adhesive relative to the amount of particulate may range from about 50% by weight to about 200% by weight. As one example, an edible adhesive may be applied in an amount ranging from about 30 mg per square inch to about 65 mg per square inch, while a seasoning particulate may be applied in an amount ranging from about 20 mg per square inch to about 110 mg per square inch. As another example, an edible adhesive may be applied in an amount ranging from about 1 g per square inch to about 3 g per square inch. Furthermore, the thickness of the layer of adhesive and the layer of particulate may vary depending on the type and amount of particulate that is to be applied. For example, a thicker adhesive layer may be required to adequately embed larger particulate. In one example, the thickness of an edible adhesive layer may range from about 1 mil to about 3 mil and the thickness of the seasoning layer may range from about 2.2 mil to about 5 mil. In some embodiments, the added particulate may be measured based on the amount that is added to the bag, and not the amount that is actually adhered to the adhesive coating, thereby accounting for an unadhered portion of the particulate. For example, about 2 to about 20 grams of particulate may be added to a bag having a coated internal surface of 100 in².

In some embodiments, a coated bag (or other container or packaging substrate) is prepared with an adhesive layer and particulate dispensing method (as described in greater detail below) configured to adhere a specified minimum portion or amount of the added particulate to the bag coating. This specified minimum portion may be quantified as a percent of the total amount of particulate added to the bag (e.g., at least about 80% of the added particulate), as an amount proportional to the weight of the applied adhesive (e.g., an amount of particulate, by weight, corresponding to at least about 50% of the total adhesive weight), a percent coverage of the coated bag surface by particulate, as determined, for example, by optical scanning of the coated bag surface (e.g., particulate covering at least 90% of the coated bag surface), or some other measurement or combination of measurements. The minimum portion of adhered particulate may depend in part on the total surface area of the bag coating, the total amount of particulate added to the bag, the size and shape of the bag, the type and/or size of particulate and other such factors.

Where a predetermined total amount of particulate is added to a bag (or other container or packaging substrate), a portion of the added particulate may not adhere to the adhesive coating. This "loose" particulate may be retained in the bag (e.g., accumulated at the bottom of the bag), such that a known predetermined total amount of particulate remains in the bag for treatment of a stored item. In some embodiments, the predetermined total amount of particulate added to the bag may be selected such that this portion of loose particulate retained in the bag is effectively minimized. In other embodiments, the loose particulate may be removed from the bag, for example, by a vacuum mechanism or by turning the bag upside-down and dumping out the loose particulate. In such an embodiment, the effectiveness of the adhesive layer and particulate dispensing method may be relied upon to provide a stored item with sufficient particulate additive to adequately treat the retained item.

While many of the exemplary embodiments described and shown herein include bags or container substrates having uniformly applied adhesive coatings, for example, for uniform treatment of an item retained in the bag, in other embodiments, a coating may be applied as a predetermined or random pattern on the interior sidewall of the bag, for example, to apply an additive to limited portions of the item. For example, a colorant additive may be applied to a foodstuff in a grill mark pattern or to apply a logo to a surface of the item. As another example, an additive carrying coating may be provided on limited portions of the packaging substrate (e.g., on one side of a bag interior or on alternating stripes of a bag interior) to limit the amount of additive applied to an item, to limit the portion of the item to which the additive is applied, or to provide visibility of the stored product through clear uncoated portions of the packaging substrate. As still another example, a first additive carrying coating may be applied to a first portion of the packaging substrate and a second additive carrying coating may be applied to a second portion of the packaging substrate, for example, to apply different additives to different portions of a stored item.

Figure 3:
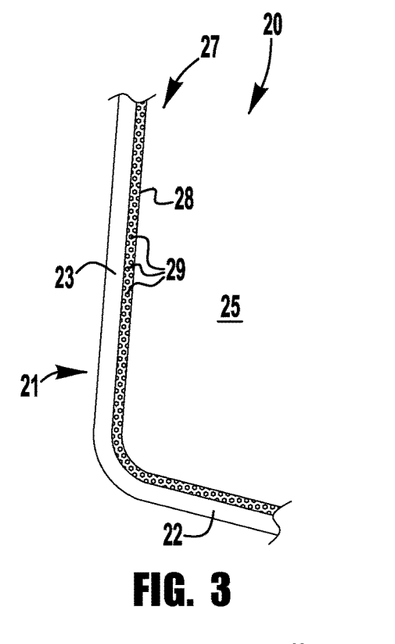
FIG. 3 is a schematic enlarged partial cross-sectional view of another coated packaging substrate in accordance with an exemplary embodiment of the present application.

As described above, the layers of adhesive and particulate may be separate, and upon application, the particulate 19 of the bag coating 17 may be at least partially embedded in the adhesive layer 18. In an alternative embodiment, as shown in FIG. 3, a coated bag or other container 20 may include an adhesive coating 27 having an adhesive layer 28 in which a particulate 29 is mixed prior to application so that the adhesive and particulate are applied as a single combined layer in a one-step application process, with the particulate 29 being intermingled within the adhesive layer 28.

In other embodiments, a particulate may be treated for adhesion to an interior surface of a bag (or other container or packaging substrate) without use of a separate adhesive layer. For example, a particulate having an adhesive film or outer surface may be dispensed into the bag, such that the particles adhere themselves to the interior surface of the bag. As another example, particles may be ionized or electrostatically charged for electrostatic attachment to the interior surfaces of the bag. In some applications, temporary adhesion of the particles to the inside of the bag may be sufficient, for example, where the item is received in the bag immediately after particle adhesion to the bag interior.

Figure 4:
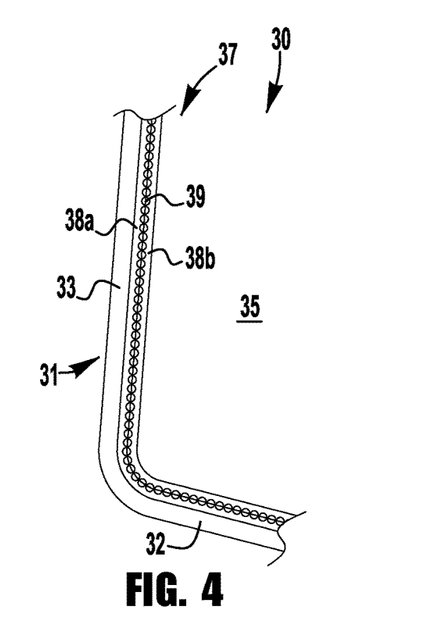
FIG. 4 is a schematic enlarged partial cross-sectional view of another coated packaging substrate in accordance with an exemplary embodiment of the present application.

In other embodiments, an adhesive layer may be applied over a particulate to hold, adhere, or cement the particulate to the substrate. As shown in FIG. 4, a coated bag or other container 30 may including an adhesive coating 37 having a first adhesive layer 38a adhered to the packaging substrate 33, particulate 39 embedded in the first adhesive layer 38a, and a second adhesive layer 38b covering the particulate 39, for example, to hold or cement the particulate 39 within the adhesive coating 37. While each adhesive layer may include substantially the same amount of the same type of adhesive, in other embodiments, the amount of adhesive supplied in the first and second layers may vary. For example, the second adhesive layer 38b may be a thinner layer or smaller amount of adhesive, for example, as a cementing or solidifying glaze or topcoat, as compared to the first adhesive layer in which the particulate 39 embeds. Additionally or alternatively, the adhesive composition in the first and second adhesive layers may be varied.

Figure 5:
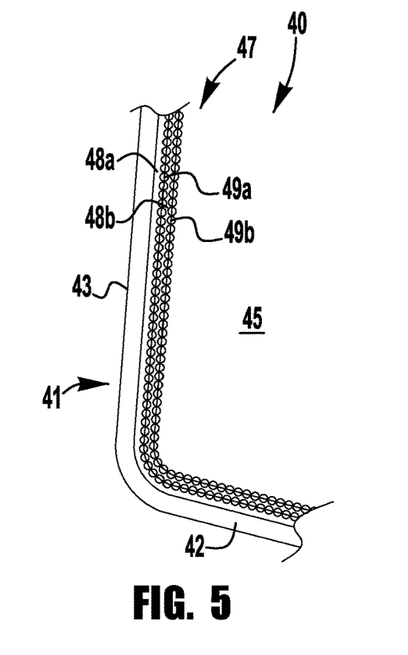
FIG. 5 is a schematic enlarged partial cross-sectional view of another coated packaging substrate in accordance with an exemplary embodiment of the present application.

In still other embodiments, multiple layers of particulate may be applied to a packaging substrate, for example, to retain more particulate than could be retained by embedding the particulate in the limited surface area of the packaging substrate, or to apply different additives in separate sequential applications. As shown in FIG. 5, a coated bag or other container 40 may include an adhesive coating 47 having a first adhesive layer 48a adhered to the packaging substrate 43, a first particulate 49a embedded in the first adhesive layer 48a, a second adhesive layer 48b covering the first particulate 49, and a second particulate 49b embedded in the second adhesive layer 48b.

Figure 6:
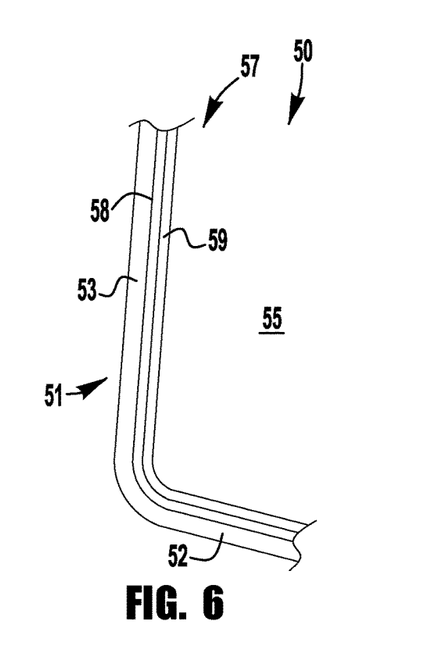
FIG. 6 is a schematic enlarged partial cross-sectional view of another coated packaging substrate in accordance with an exemplary embodiment of the present application.

In other embodiments, in addition to or instead of embedded particulates, additives used in embodiments of the present application may include non-particulate additives (e.g., in addition to or instead of particulate additives), such as, for example, liquids and gels. While the liquid or gel additive may be mixed with the adhesive to form a packaging substrate coating with a single adhesive layer, in another exemplary embodiment, as shown in FIG. 6, a coated bag or other container 50 may include an adhesive coating 57 having an adhesive layer 58 adhered to the packaging substrate 53, and a separate liquid or gel additive layer 59 adhered to the adhesive layer 58.

A wide variety of suitable item-treating non-particulate additives may be utilized in various exemplary embodiments of the present application, including, for example, any suitable edible or inedible liquid/gel additives. Liquid additives used in embodiments of the present application may include, for example, natural or artificial colors (e.g., dyes), natural or artificial flavors (e.g., sauces, juices, marinades), liquid smoke, acidulants, natural extracts, syrups, phenols (e.g., resveratrol), liquid supplements (e.g., vitamins, minerals, proteins, fiber, caffeine, herbal supplements), deodorizers, fragrances, and alcohols. In non-food based embodiments, exemplary liquid additives may include, for example, paints or dyes. Gel additives used in embodiments of the present application may include, for example, Aloe vera gel or some other hydrocolloid.

According to another aspect of the present application, any suitable number of adhesive layers, particulate layers, and non-particulate additive layers, such as, for example, the adhesive, particulate, and non-particulate additive layers described above, may be provided on a packaging substrate surface for one or more enhancements or treatments of an item retained with the packaging substrate.

While the present application contemplates the use of coated bags in a variety of applications, in one embodiment, a coated bag may be used to store (e.g., in a refrigerated, frozen, or room temperature, shelf-stable condition), prepare (e.g., marinate), and/or cook (e.g., bake, boil, microwave) or otherwise process a food item or foodstuff, and therefore may include an edible (i.e., non-toxic) interior coating for applying one or more additives to a foodstuff contained in the bag. As used herein, the term "foodstuff" may be any substance that can be used or prepared for use as a food. In one embodiment, the foodstuff is protein-based, such as a piece of fish or meat (e.g., turkey, chicken, beef, pork, etc.), cheese, or tofu. In another embodiment, the foodstuff may include one or more vegetables, such as broccoli, carrots, Brussels sprouts, corn, etc. In other embodiments, the foodstuff may be one or more other food products, such as grains and nuts, or beans, or may be a combination of types of foods.

To apply the additive in a bag coating to an item contained in the bag cavity, the coating may be configured to be heated, wetted (e.g., with water, fat, alcohol, or some other solvent) or otherwise treated to release the additive from the interior surface of the bag, allowing the additive to contact, penetrate, be absorbed by, or otherwise treat an exterior surface of the item. In an exemplary embodiment, an adhesive layer of a coated food storage bag may be configured to release a particulate during refrigerated storage of a packaged food product in the bag, for example, at a suitable release temperature. Where the additive is provided in the form of a particulate embedded in and/or covered by the adhesive layer, dissolution, melting, flaking, or other release of the adhesive layer allows for release of the particulate from the interior surface of the bag cavity and onto the exterior surface of the item. Additionally or alternatively, particulate embedded in an adhesive layer may itself dissolve or otherwise detach due to heating, wetting or other such treatment, independent of, and in some cases without, any dissolution or release of the adhesive layer.

According to an aspect of the present application, the condition (e.g., temperature, moisture, etc.) for releasing the coating additive onto the retained item may be selected to provide a predetermined amount or degree of release of the additive. For example, a release condition (e.g., temperature or moisture content) may be selected to correspond to an initiation or beginning of a release of the coating additive.

As another example, a release condition may be selected to correspond with release of a certain portion of the adhered additive (e.g., at least about 75% of the adhered additive) or by release of a certain portion of the combined adhesive and additive coating (e.g., at least about 75% of the bag coating). Examples of release conditions include temperatures ranging from about 28° F. to about 200° F., moisture content ranging from about 18% to about 100% (wb), time delay of about 15 minutes to about 2 hours or longer (depending on temperature), or some combination of two or more of these parameters. An amount or degree of additive release may be measured, for example, by weighing the coated bag before and after release conditions have been effected.

When an additive adhered to an interior surface of a bag or other container is released, the released additive may tend to drop or slide down to a bottom portion of the container cavity, resulting in a disproportionately large portion of the additive material being applied to a lower portion of the stored item resting in the bottom portion, and a disproportionately small portion of the additive material being applied to an upper portion of the stored item elevated from the bottom of the container cavity. To prevent or minimize the pooling or concentration of released additive at the bottom of the bag, and the resulting uneven treatment of the item, the bag may be placed into surrounding contact with the item prior to or substantially concurrent with the release of the additive from the coating, such that contact between the item and the bag impedes the dropping or sliding of the released additive into the bottom portion of the bag cavity. In one such example, a bag or other container may be sized and shaped to closely receive the item in surrounding contact when the item is first inserted into the container. In another exemplary embodiment, a "shrinkable" bag (e.g., heat or vacuum shrinkable, as described below) may be shrunk, collapsed, or otherwise drawn into surrounding contact with the item prior to or substantially concurrent with initiation of release of the item treating additive, such that the additive remains adhered to the bag until contact between the item and the bag is sufficient to minimize pooling of any additive that is released.

In some embodiments, an exterior surface of the stored item may include one or more properties (e.g., moisture, solvent, temperature, adhesive) that initiate release of the additive from the bag coating onto the item when the bag coating comes into contact with the exterior surface of the item. As a result, an additive adhered to a portion of the interior surface of a bag is not released until the item is in contact with that portion of the bag interior surface. Where an item is placed into a bottom portion of a shrinkable bag cavity, a bottom surface of the received item may initiate release of additive adhered to the bottom portion of the bag. Where the bottom portion of the bag is substantially flat, pooling of released additive at the bottom of the bag may be negligible. Where the bottom portion of the bag is not flat (e.g., a seamed bottom of the bag, or a bag supported on an uneven surface), or where the received item may also loosely contact side portions of the bag, pooling of the additive released from these surfaces of the bag may be more significant. In such embodiments, it may be desirable to shrink the bag into surrounding contact with the received item (e.g., by one or more of heat shrinking and vacuum suction) within a relatively short time period (e.g., less than 30 seconds) of placement of the item in the bag to minimize the release of portions of the additive prior to surrounding contact of the bag with the item, to avoid pooling or collecting of the released additive in the still-loose bag.

Figure 7A:
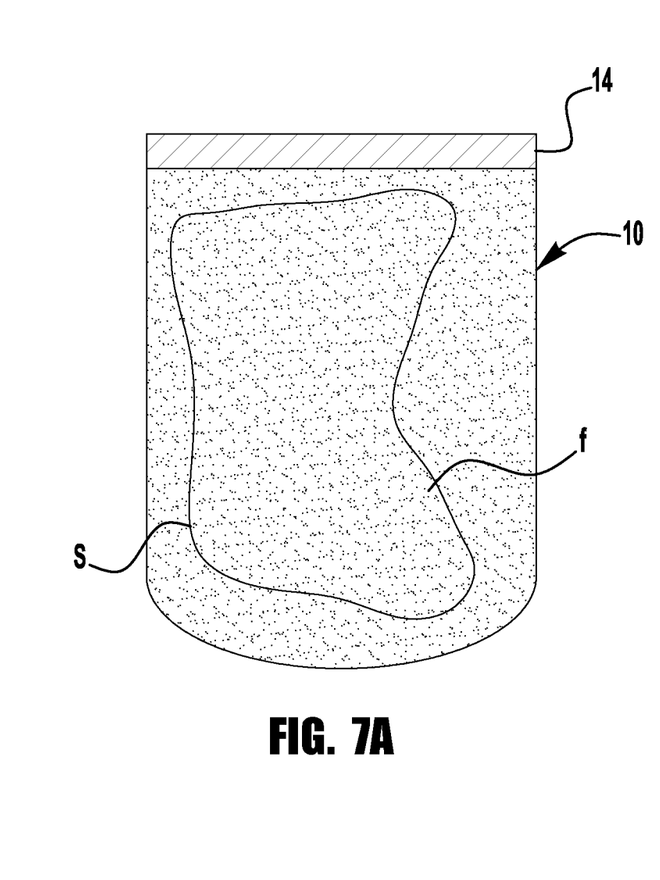
FIG. 7A is a schematic view of a coated bag storing a foodstuff for pre-treatment of the foodstuff.
Figure 7B:
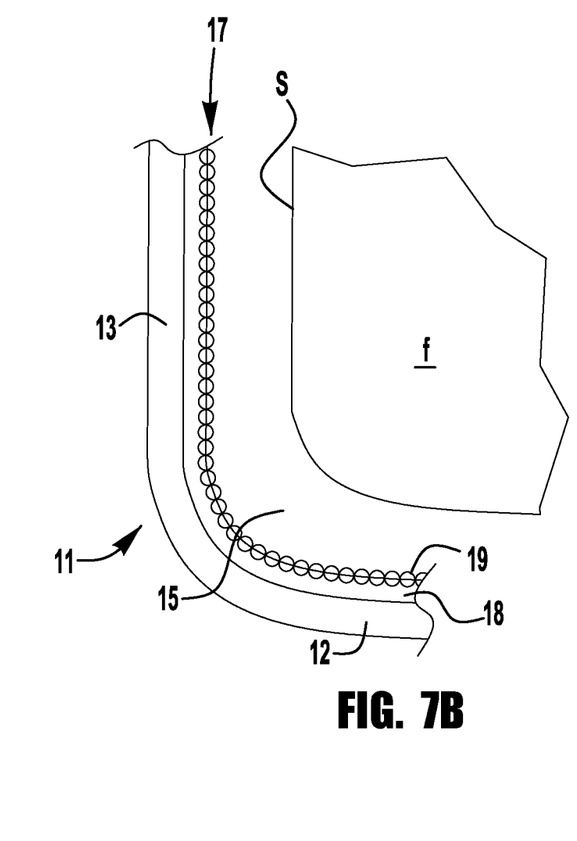
FIG. 7B is a schematic enlarged partial cross-sectional view of the coated bag and foodstuff of FIG. 7A.
Figure 8A:
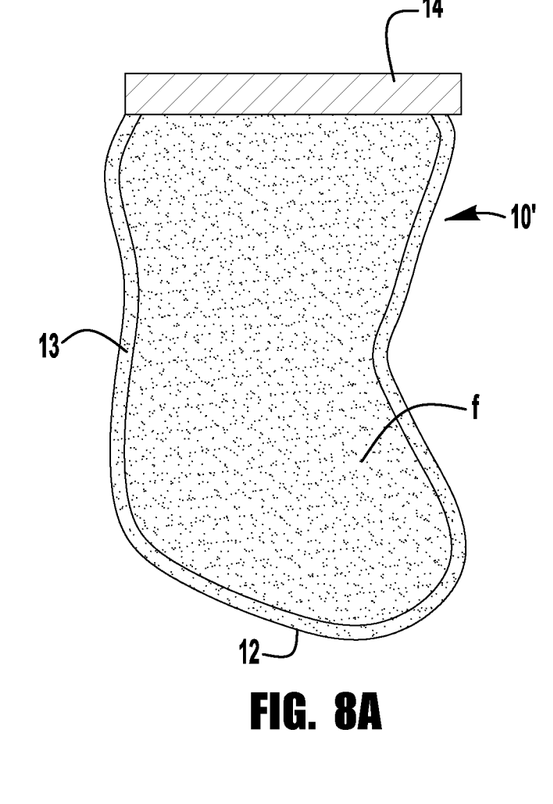
FIG. 8A is a schematic view of the coated bag and foodstuff of FIG. 7A, with the bag heat shrunk into surrounding contact with the foodstuff.
Figure 8B:
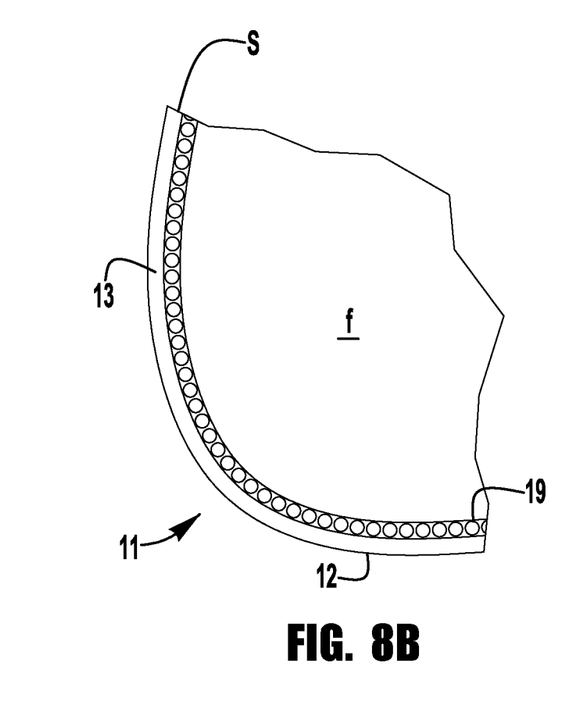
FIG. 8B is a schematic enlarged partial cross-sectional view of the heat shrunk coated bag and foodstuff of FIG. 8A.

In an exemplary embodiment, as shown in FIGS. 1A, 7B, 8A, and 8B, a coated shrinkable bag 10 is used to package a foodstuff f and to uniformly treat an exterior surface s of the foodstuff with a particulate additive 19 carried by the bag coating 17. When the foodstuff is received in the coated bag cavity and the open end of the bag is sealed closed, for example, by heat sealing, adhesive sealing, or mechanical sealing to complete a "foodstuff packaging" process, as shown in FIGS. 7A and 7B, the bag 10 is heated to a temperature selected to initiate shrinkage of the heat shrink bag (i.e. a temperature at or above the orientation temperature of the heat shrink material) into surrounding contact with the foodstuff. In one such embodiment, the heat shrink film is selected to have an orientation temperature of at least about 60° C. When the coated interior surface of the heat shrunk bag 10' contacts the moist exterior surface of the foodstuff f, as shown in FIGS. 8A and 8B, the moistened adhesive layer dissolves to release the embedded particulate 19 (e.g., seasoning, colorant) onto the contacting exterior surfaces s of the foodstuff f. While the bag may be heat shrunk into surrounding contact with the foodstuff any time after foodstuff packaging, in some embodiments, the heat shrink process is initiated within a short time of foodstuff packaging (e.g., less than 30 seconds), to minimize the release of portions of the particulate prior to heat shrunk surrounding contact of the bag with the foodstuff, for example, to avoid pooling or collecting of the released particulate in the still-loose bag.

In other embodiments, a foodstuff packaged in a coated bag may be configured for release of the coating carried additive during cooking of the bagged foodstuff, such as, for example, during microwaving or cook-in-bag (e.g., boil-in-bag or bake-in-bag) preparation of the foodstuff. In one example, the adhesive coating of a coated bag may be configured to melt or otherwise break down at higher temperatures to release the additive onto the foodstuff during cooking. In another example, a bagged foodstuff having little or no surface moisture at room temperatures (e.g., potatoes) may generate steam or other moisture during heating of the bagged foodstuff, sufficient to dissolve the adhesive coating for release of the additive onto the foodstuff.

According to another aspect of the present application, uniform coating, seasoning, curing, coloring, or other such uniform additive treatment of a packaged item (e.g., foodstuff) may be maximized by utilizing a seamless bag defining a flexible, continuous interior sidewall surface that is less likely to provide inconsistencies or deviations in the item surface treatment (e.g., high or low coating concentrations) than would be experienced across a seamed surface of the bag. While a seamed bag may be formed from a film that is coated with an adhesive material prior to formation of the bag, with a sheet stock of film fed from a roll into an application zone where the adhesive is applied (e.g., sprayed onto the film), adhesive coating of a seamless bag (e.g., a heat shrink bag) may need to be performed after formation of at least the seamless sidewall portion of the bag. Thus, the present application contemplates various methods for applying an adhesive coating to an interior surface of a formed container (e.g., a seamless bag).

Systems for coating an interior surface of a formed bag may utilize, for example, one or more of spraying, brush or sponge application, dipping, rinsing, or flooding. In some embodiments, an adhesive material may be applied to an exterior surface of the bag, with the bag being subsequently inverted to provided the adhesive coating on the eventual interior surface of the bag. In other embodiments, an adhesive dispenser may dispense (e.g., spray, inject, pour, pump) an adhesive material into the bag cavity. While the adhesive material may be dispensed from an adhesive dispenser maintained outside the bag cavity, in other embodiments, the adhesive dispenser may be inserted into the bag cavity, which may provide for a more uniform coating of the bag cavity.

Figure 9:
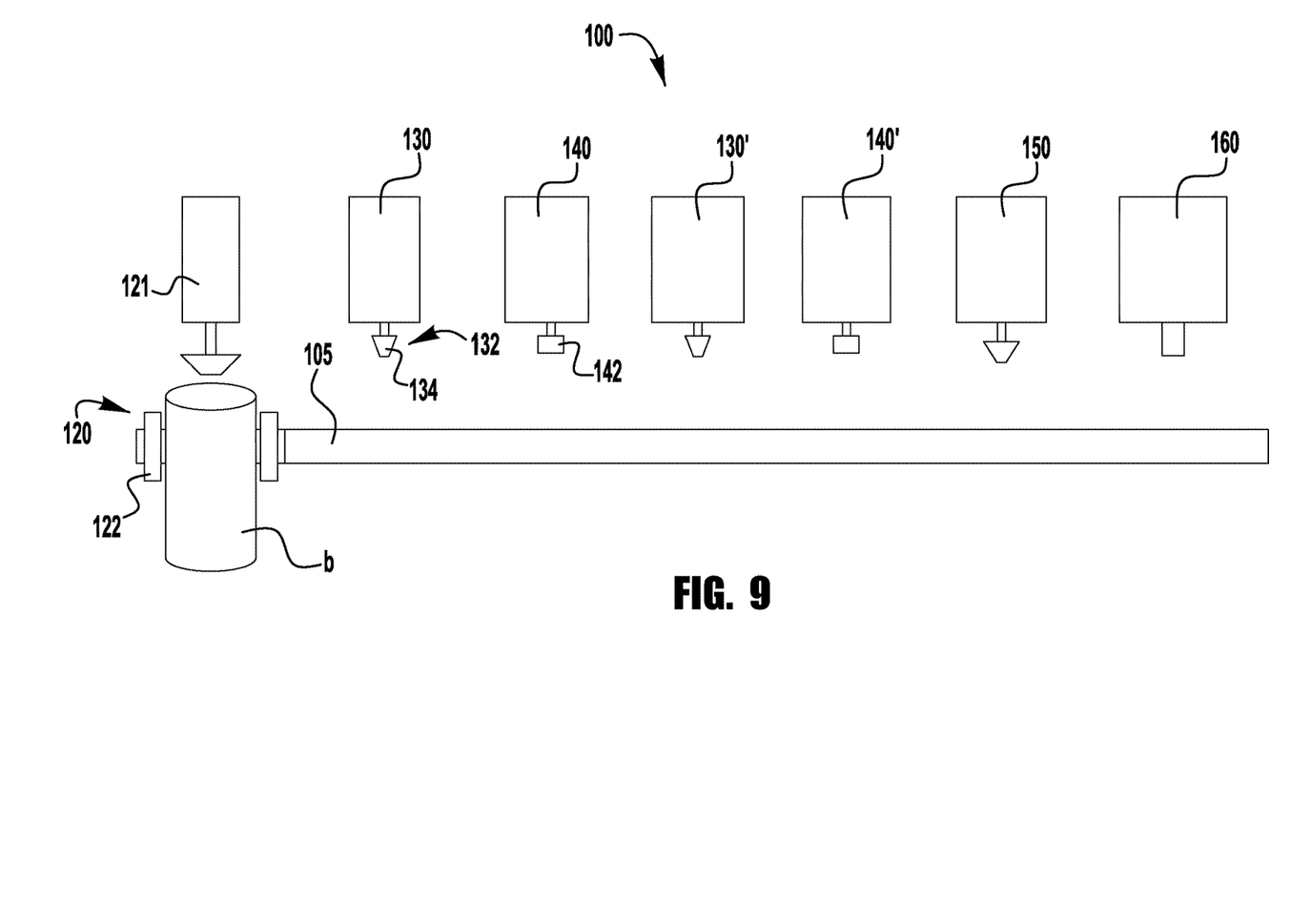
FIG. 9 is a schematic view of an exemplary bag coating system in accordance with an exemplary embodiment of the present application.

Referring to FIG. 9, an exemplary system for forming a coated bag b for pre-treating an item stored in the bag is schematically shown at 100. The exemplary system 100 includes one or more of a bag retaining fixture 120, an adhesive dispenser 130, a particulate dispenser 140, and a drying mechanism 160.

One or more bags to be coated may be introduced to or placed in the system 100 using any suitable arrangement (not shown) of bags fed or transported into engagement or retention with the bag retaining fixture 120, including, for example, a roll of perforated bags, a stack of bags, a wicketed bag arrangement, or manually loaded bags.

The bag retaining fixture 120 may utilize any suitable arrangement to hold a bag b to be coated in an open or expanded position to facilitate the application of adhesive and/or particulate to an interior surface of the bag. For example, the bag retaining fixture 120 may utilize clamps, clips or other attachments to fasten to an upper edge of the bag, with the attachments being movable to spread the upper edge of the bag, thereby opening or expanding the bag. This attachment may be limited to the upper edge portion of the bag that will subsequently be sealed and therefore would not require an interior coating on this portion, thus allowing for fixture contact with the interior surface of this upper edge portion. In an exemplary embodiment, the bag retaining fixture 120 may be configure to cover or mask an upper interior portion of the bag b (e.g., with a band, cuff, or other such structure), to prevent the application of an adhesive coating to this upper interior portion, such that the adhesive coating and/or particulate adhering to the adhesive coating does not impair subsequent sealing of the upper portion of the bag (e.g., after an item has been placed in the bag).

As another example, a blower may be used to apply pressurized air (or other pressurized gas) to the inside of the bag, thereby inflating the bag into an open, expanded condition. As still another example, a bag spreading block may be inserted into the bag to spread the bag into an open, expanded condition. As yet another example, a plurality of suction applicators may be brought into contact with outer surfaces of the bag, with the suction applicators applying vacuum suction to the bag sidewall to maintain the bag in an open, expanded condition. In an exemplary embodiment, a first, opening mechanism 121 (e.g., a blower or bag spreading block) may be utilized to initially open the bag b to an expanded condition, and a second, retaining mechanism 122 (e.g., suction applicators) may be utilized to maintain the bag b in this expanded condition during the adhesive and/or particulate dispensing operations. In one such embodiment, the opening mechanism 121 may be stationary and the retaining mechanism 122 may travel with the bag retaining fixture 120 along a conveyor 105 to move the open bag b to one or more bag coating stations (e.g., an adhesive dispenser 130 or particulate dispenser 140) along the conveyor 105. The bag expanding and retaining fixture may be configured to provide the bag in an expanded condition in which the interior of the bag is free of acute angles, sharp corners, or creases, for example, to promote a uniform application of coating material to the interior sidewall of the bag.

Figure 10:
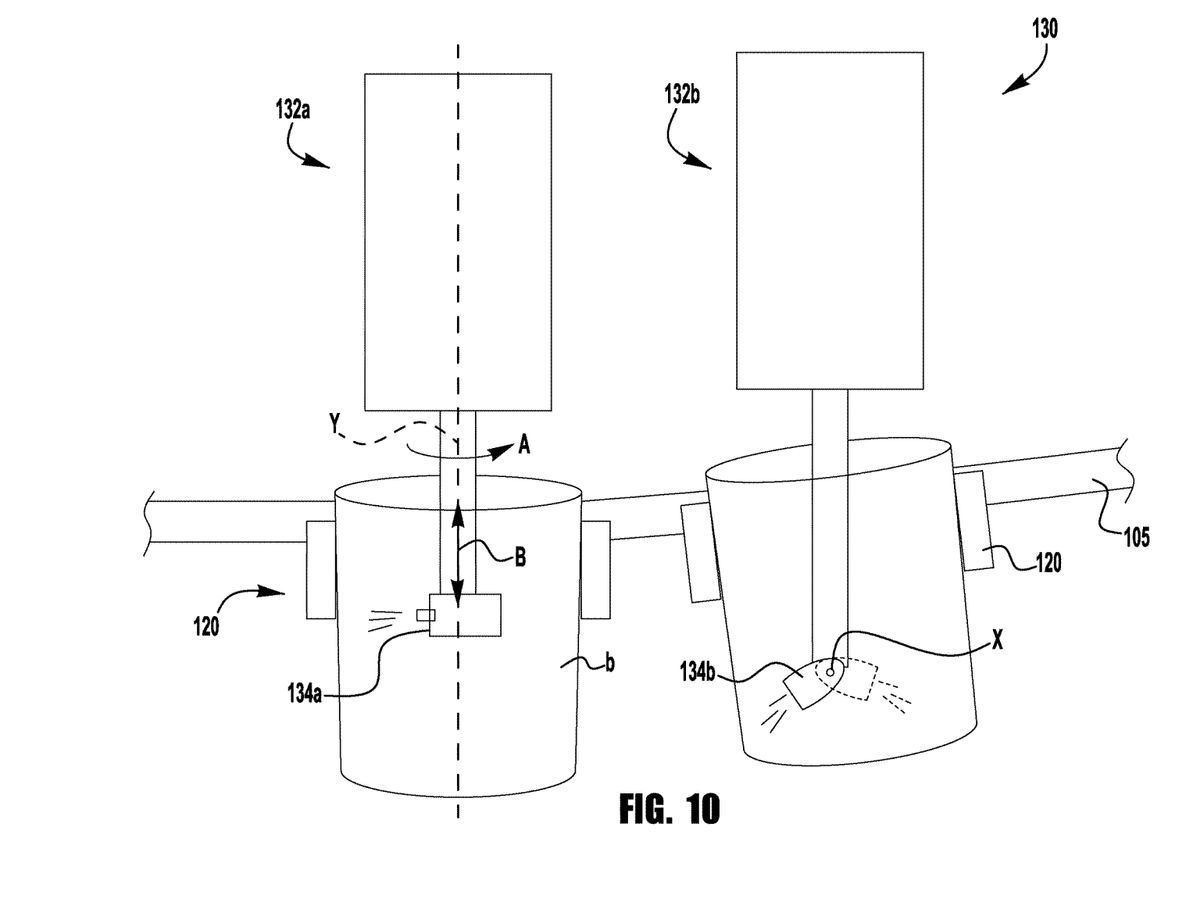
FIG. 10 is a schematic view of an adhesive dispensing arrangement for a coated bag in accordance with an exemplary embodiment of the present application.

While the adhesive dispenser 130 may include any suitable device for applying a coating of adhesive to an interior surface of a bag b, in an exemplary embodiment, as shown in FIG. 10, the adhesive dispenser 130 includes one or more sprayers 132 insertable into the cavity of the open or expanded bag and having a nozzle 134 configured to apply a substantially uniform coating of a liquid adhesive to the interior surface of the bag b. In the illustrated example, the bag b is fixtured with an open end of the bag facing upward, such that the nozzle 134 is lowered or inserted into the open bag from above. In other embodiments (not shown), the bag may be fixtured with the open end facing downward, such that the nozzle is raised or inserted into the open bag from below. In still other embodiments, where an internal surface of a tube shaped substrate is being coated (e.g., a bag prior to sealing one or both ends), nozzles may be inserted into either or both open ends of the tube.

The nozzle 134 may be configured to supply a spray pattern that extends around an entire circumference of the sprayer for simultaneous application of adhesive to an entire sidewall inner surface. In other embodiments, as shown in FIG. 10, a nozzle portion 134a of a sprayer 132a may be rotatable (e.g., in direction of arrow A) with respect to the bag about a vertical axis Y (e.g., by a motor driven shaft) during the spraying operation to apply adhesive to the entire inner periphery of the sidewall inner surface as the nozzle portion 134a rotates about the vertical axis Y. Alternatively, the nozzle may remain rotationally fixed and the bag may be rotated with respect to the nozzle to apply adhesive to the entire circumference of the sidewall inner surface.

Further, the nozzle may define a vertically elongated spray source that extends substantially along an entire vertical length of the bag cavity sidewall when the sprayer is inserted in the open, expanded bag, for simultaneous application of the adhesive to the entire vertical length of the bag cavity sidewall. This vertical length of the bag cavity sidewall may exclude an upper edge portion of the bag sidewall along which the bag is subsequently sealed. In other embodiments, as shown in FIG. 10, the nozzle portion 134a of the sprayer 132a may be vertically movable along the vertical axis Y along arrow B with respect to the bag (e.g., by a motor driven piston) during the spraying operation to apply adhesive to the entire vertical length of the sidewall. Alternatively, the nozzle may remain vertically fixed and the bag may be moved vertically with respect to the nozzle to apply adhesive to the entire vertical length of the sidewall.

A bag having a sealed bottom end presents an upward facing bottom portion in addition to the laterally facing sidewall portions. In some applications, relying on excess liquid adhesive sprayed on the sidewalls to run down to the bottom of the bag may produce uneven or unsatisfactory coating of portions of the bag. To provide an adhesive coating on the bottom portion of the bag, a nozzle of an inserted sprayer may be configured to spray liquid adhesive in both a lateral direction (i.e., to coat the sidewall portion of the bag) and in a downward direction (i.e., to coat the bottom portion of the bag).

In another embodiment, as shown in FIG. 10, an adhesive dispensing arrangement for coating an interior surface of a bag b may utilize a first adhesive dispenser 132a (e.g., as described above) for spraying a liquid adhesive laterally onto an interior surface of a sidewall portion of the bag, and a second adhesive dispenser 132b for spraying a liquid adhesive downward onto an interior surface of a bottom portion of the bag, to provide a substantially uniform adhesive coating on the entire bag cavity. In such an embodiment, operation of the first and second adhesive dispensers 132a, 132b may be separately adjustable (e.g., by adjusting one or more of spray time, pressure, viscosity, nozzle movement, number of passes) to optimize coating thickness, adhesion, and uniformity. In one such embodiment, as shown in FIG. 10, the nozzle portion 134b of the second adhesive dispenser 132b is pivotable about a horizontal axis X during the spraying operation to apply adhesive to the entire bottom surface of the bag cavity as the nozzle portion pivots about the horizontal axis. Other movement of the second adhesive dispenser nozzle may additionally or alternatively be employed, including, for example, lateral movement or rotational movement about a vertical axis.

While many different types of liquid adhesives may be sprayed into the bag cavity as described above, including adhesives having viscosities ranging, for example, from about 1 dPa to about 100 dPa, in an exemplary embodiment, the viscosity of the liquid adhesive may be limited or controlled, for example, to reduce or prevent clogging of the sprayer nozzle portions, to reduce the pressure required to apply the adhesive, and/or to facilitate formation of a uniform coating of adhesive in the bag cavity. In one such embodiment, the liquid adhesive, when sprayed, may have a viscosity between approximately 5 dPa and approximately 40 dPa, between approximately 5 dPa and approximately 25 dPa, or between approximately 6 dPa and approximately 10 dPa. To reduce the viscosity of the liquid adhesive to a suitable range for spraying, an existing adhesive may be further diluted with water. For example, an edible adhesive having a standard viscosity of about 40 dPa to about 85 dPa may be diluted with about 10% to about 33% water to provide a sprayable liquid adhesive having a viscosity between about 6 dPa and about 10 dPa. Additionally or alternatively, to limit the viscosity of the liquid to a suitable range for spraying, the temperature of the liquid adhesive may be elevated. In one embodiment, an adhesive having a room temperature viscosity of about 80 dPa to about 85 dPa is heated to a temperature between about 87° F. and about 175° F. (or between about 110° F. and about 160° F.) to reduce the viscosity to between about 25 dPa and about 40 dPa (and may additionally be diluted with water as described above for improved sprayability). Heating the liquid adhesive may be preferable to dilution in some applications, as the adhesive may better maintain its adhesive properties in an undiluted or less diluted state. Under ambient conditions, this heated liquid may cool to suitable temperatures upon contact with the bag, such that the bag material is not melted, softened, heat-shrunk or otherwise affected by the heated liquid adhesive. In one such exemplary embodiment, a liquid adhesive heated to a temperature between approximately 110° F. and approximately 160° F. is safely sprayed onto a bag surface between approximately 3 inches and approximately 11 inches from the nozzle without adversely affecting the bag material.

The amount of liquid adhesive applied to the bag surface (or other such packaging substrate) may depend on the amount and type of particulate (or other material) to be adhered to the adhesive layer, or the amount of material included in the adhesive layer that is desired for the packaging. For example, bags or other packaging substrates may be provided with adhesive layers having areal density ranges of about 30 mg/in$^2$ to about 65 mg/in$^2$ for adhesion of powder particulate (e.g., antimicrobial particles), or about 1 g/in$^2$ to about 3 g/in$^2$ for adhesion of larger particles (e.g., cracked black pepper or other larger spice particles), or areal density ranges in between these two ranges for adhering particles ranging between these two size extremes.

When a liquid adhesive, particularly a low viscosity liquid adhesive, is sprayed onto a vertically extending plastic substrate, such as a bag film or sidewall, the liquid adhesive may have a tendency to run or drip down the substrate before having the opportunity to dry or cure on the substrate surface. Reducing the amount of liquid adhesive sprayed onto a vertical substrates surface may minimize or avoid running or dripping of the liquid. However in a coated bag spraying application, if the amount of liquid adhesive sprayed into the bag is limited to an amount that inhibits dripping or running of the adhesive, the resulting adhesive coating may be insufficient to suitably adhere later added particulate, or insufficient to provide adequate additives to the stored item (where the additives are included in the liquid adhesive). According to an aspect of the present application, a liquid adhesive may be applied to the interior sidewall of a bag in multiple passes or applications, allowing the sprayed adhesive a brief period of time to begin to dry and adhere to the sidewall before an additional application of the liquid adhesive is sprayed onto the same location of the bag sidewall. Where an adhesive dispenser with a rotating spray nozzle is utilized, the nozzle may perform multiple continuous or discontinuous rotations while spraying to provide multiple applications of liquid adhesive around the inner perimeter of the bag sidewall. Where an adhesive dispenser with a vertically sliding spray nozzle is utilized, the nozzle may perform multiple vertical passes while spraying to provide multiple applications of liquid adhesive along the vertical length of the bag sidewall. Where an adhesive dispenser with a rotating and vertically sliding spray nozzle is utilized, the nozzle may perform a single vertical pass while rotating, a single rotation while making multiple vertical passes, or a combination of multiple rotations and multiple vertical passes. Additionally or alternatively, the nozzle may be configured to cease spraying for a predetermined period of time before resuming spraining to dispense a subsequent application of the liquid adhesive.

In an exemplary embodiment, a liquid adhesive is dispensed in multiple applications on a bag sidewall surface to provide an adhesive layer having a desired cumulative area density resulting from the multiple passes or applications of the liquid adhesive. For example, the liquid adhesive may be dispensed in two to ten applications, with each application dispensing an area density of about 0.1 $g/in^2$ to 1.5 $g/in^2$ (for a cumulative area density of about about 1 $g/in^2$ to about 3 $g/in^2$). To allow time for an application of the liquid adhesive to affix to the substrate (e.g., to begin to dry or cure), a time period (e.g., about 1 to about 5 seconds) may be provided between liquid adhesive applications to a location on the bag sidewall, either by multiple rotational or vertical passes of a moving spray nozzle (with the time period being defined by the cycle time of the nozzle movement) or by ceasing spraying for a period of time, or both. While each application or pass of liquid adhesive may supply the same amount of liquid adhesive to a given location, in other embodiments, the amount of liquid adhesive supplied in each application may vary (e.g., by varying duration, nozzle flow rate, nozzle movement speed, pressure, etc.). For example, subsequent liquid adhesive applications may dispense a larger amount of liquid adhesive than an initial liquid adhesive application if it is determined that the liquid adhesive is less likely to drip or run when sprayed on the adhesive coated bag sidewall. Still other parameters may be varied in one or more of the liquid adhesive applications, including, for example, temperature, viscosity, dilution, and liquid adhesive composition. When application of the liquid adhesive layer is completed, a longer time period (e.g., 2-10 minutes) may be provided to at least partially dry or cure the adhesive, for example, prior to embedding a particulate in the adhesive.

Additionally or alternatively, while the adhesive may be sprayed on untreated films, in other embodiments, the bag film material may be adapted for increased surface tension, for example, by corona treatment of the bag surface. This increased surface tension reduces the liquid adhesive's tendency to "bead up" on the interior bag sidewall, thereby promoting a more uniform adhesive coating on the interior sidewall surface. In an exemplary embodiment, the bag film is corona treated to a surface tension between about 30 dynes/cm and about 38 dynes/cm, or between about 30 dynes/cm and about 34 dynes/cm, to promote adhesion of the liquid adhesive to the film and to minimize beading or dripping of the liquid adhesive on the film.

The applied adhesive layer may include an additive for treating an item stored in the bag, including, for example, a particulate, liquid, and/or gel additive, as described above, mixed in with the liquid adhesive for application of a single layer additive carrying coating to the interior surface of the bag. In other embodiments, one or more particulate, liquid, and/or gel additive layers may be applied to an adhesive layer on the bag interior to secure the additive to the bag surface for subsequent release on an item stored in the bag. As described herein, these additive layers may be applied to the bag at different stations on a conveyor along which a bag is transported.

In the system 100 of FIG. 9, a particulate dispenser 140 is utilized to dispense one or more types of solid particulate into the bag after formation of the adhesive coating on the bag interior sidewall, such that the particulate is embedded in the adhesive coating. In the illustrated example, the adhesive coated bag (held open by retaining mechanism 122) is moved along a track or conveyor 105 into alignment with the particulate dispenser 140 to receive particulate from an outlet 142 of the particulate dispenser. In other embodiments, the adhesive coated bag may instead remain stationary, with the particulate dispenser aligning with the bag (and, optionally, with the adhesive dispenser moving out of alignment with the bag to accommodate the particulate dispenser).

Many different types of particulate dispensing mechanisms may be utilized. In one embodiment, a relatively large amount of particulate may be dumped into the bag, for example, from a pressurized hopper, to fill the bag with enough particulate to substantially fully cover the adhesive layer with embedded particulate. In other embodiments, the particulate may be spread, sprayed, pumped, or otherwise projected onto the interior sidewall of the bag, to reduce the amount of particulate dispensed into the bag cavity. Excess particulate that does not adhere to the adhesive layer of the bag cavity may be removed, for example, by a vacuum mechanism or by turning the bag upside-down and dumping out the loose particulate. The removed excess particulate may be re-used or recycled (e.g., by first filtering the particulate to remove particulate that may have clumped together from exposure to adhesive material). Where the particulate is applied to the interior sidewall of a tubular substrate (e.g., a tube from which a bag is formed by subsequently sealing a bottom end) having an open bottom end, the loose particulate may be permitted to drop through the open bottom end into a bin or container for subsequent disposal or reuse.

Figure 11:
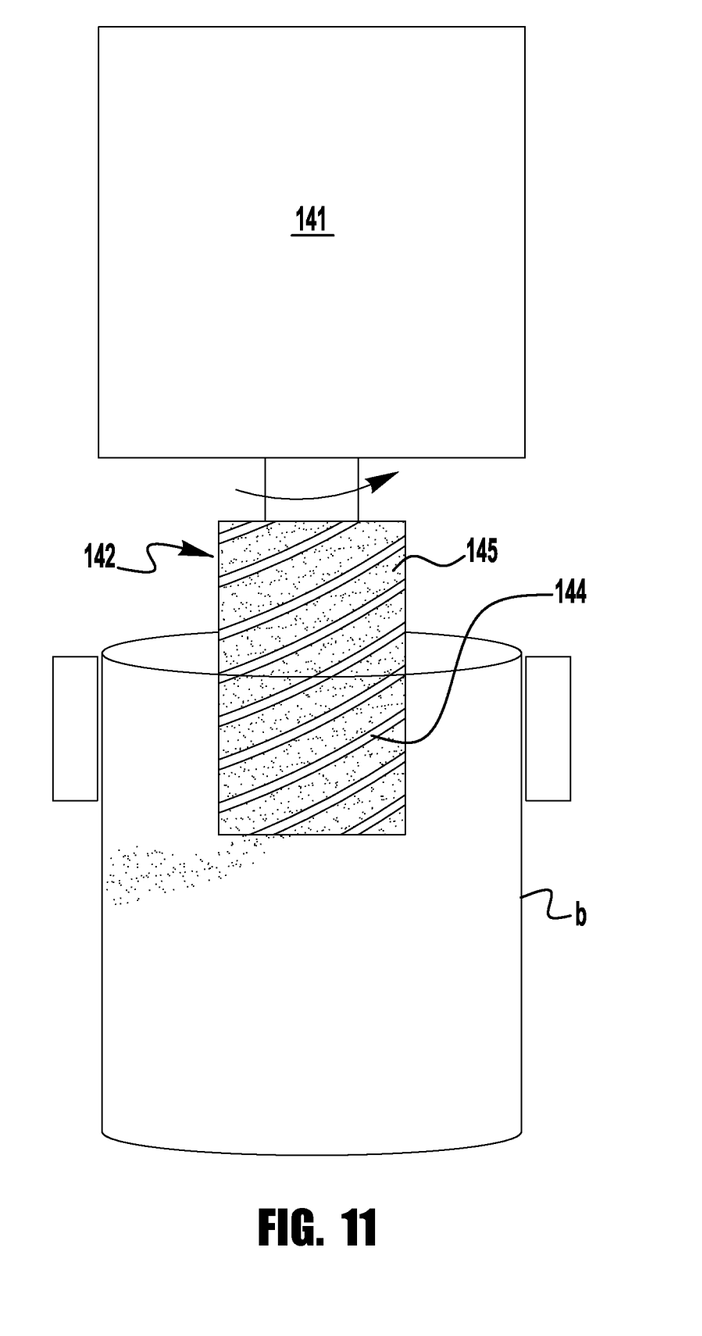
FIG. 11 is a schematic view of a particulate dispensing arrangement for a coated bag in accordance with an exemplary embodiment of the present application.

In an exemplary embodiment, as shown in FIG. 11, the particulate dispenser 140 includes a particulate spreading auger 142 having a rotating helical blade 144 within a tubular conduit 145 into which particulate is fed from a hopper 141 or other source. As the helical blade of the auger rotates, the particulate is dispensed in a metered fashion from the conduit, and is projected laterally outward from the auger toward the interior sidewall of the bag b. Particulate that does not adhere to the sidewall drops to the bottom portion of the bag to adhere to the adhesive layer on the bag bottom portion, and/or to remain loose at the bottom of the bag (e.g., for subsequent removal from the bag or for retention in the bag with a stored item).

In some embodiments, the particulate dispenser may be configured to dispense two or more types of particulate onto a single particulate layer, using one or more particulate spreading augers or other such devices as described above. Where multiple particle spreading devices are used, these devices may occupy different locations along the conveyor, requiring movement of the fixtured bag along the conveyor to each of these multiple locations. Alternatively, multiple particle spreading devices may be operable to supply the multiple types of particulate to the interior of the bag in a fixed bag location.

In some embodiments in which multiple types of particulate are applied, a first particulate (e.g., cracked black pepper) is a larger particulate and a second particulate is a smaller particulate (e.g., chili powder), with the larger particulate having an average granule size of up to about 100 times or more than an average granule size of the smaller particulate, or a typical ratio of about five times to about twenty-five times the average particle size. In one example, a larger first particulate has an average granule size of up to about 6.730 mm (or a range between about 0.841 mm and about 6.730 mm), and a smaller second particulate has an average granule size of as small as about 0.037 mm (or a range between about 0.037 mm and about 0.707 mm). In such an embodiment, the larger particulate may be applied first, with the embedded larger particulate defining spaces between the larger particulate sufficient for embedding the subsequently applied smaller particulate.

According to another aspect of the present application, the surface of the adhesive layer may be adapted to better absorb or attract particulate to facilitate the embedding of the particulate in the adhesive layer. As one example, the adhesive layer may be softened or texturized to retain particles projected onto the adhesive layer, making these particles less likely to bounce off of the adhesive coated bag sidewall. The softness or texture of the adhesive layer may be modified, for example, by aeration of the liquid adhesive as the liquid is sprayed onto the bag sidewall. In an exemplary embodiment, a liquid adhesive is aerated with a suitable gas, such as, for example, air, carbon dioxide, nitrogen, or some other inert gas, to trap minute bubbles throughout the adhesive coating. The aerated liquid adhesive may produce a foamed adhesive coating. As another example, the nozzle pressure and flow configuration may be selected to generate an adhesive foam, or small, soft beads of glue that adhere to the bag substrate in a soft, textured pattern. In one embodiment, the liquid adhesive is sprayed at a pressure between approximately 200 psi and approximately 1300 psi.

The bag coating system may be configured to apply a second adhesive layer over the embedded particulate, for example, to hold, adhere, or cement the embedded particulate to the interior sidewall of the bag, as described above and shown in the embodiment of FIG. 4. The second adhesive layer may be applied by the same adhesive dispenser that supplied the first adhesive layer (e.g., by moving the bag along conveyor 105 back into alignment with the adhesive dispenser 130, or by moving the adhesive dispenser back into alignment with the bag). While application of the first and second adhesive layers may be performed in substantially the same manner, in other embodiments, the adhesive dispenser may be configured to apply a different amount of liquid adhesive in forming the second adhesive layer as compared to formation of the first adhesive layer (e.g., by varying duration, nozzle flow rate, nozzle movement speed, pressure, etc.). For example, a second adhesive layer may be a thinner layer or smaller amount of adhesive, for example, as a cementing or solidifying glaze, as compared to the first adhesive layer in which the particulate embeds. As another example, uniformity of the second adhesive layer may be less important than uniformity of the first adhesive layer, as the layer particulate has already embedded and the second adhesive layer is merely solidifying this embedded condition (and not affecting the concentration or distributing of the embedded particulate). Still other parameters may be varied in the application of the second adhesive layer, including, for example, temperature, viscosity, dilution, and liquid adhesive composition. In an exemplary embodiment, a liquid adhesive is dispensed in multiple applications, as described above, on a bag sidewall surface to provide a second adhesive layer onto the embedded particulate, with the second adhesive layer having an area density of about 1 g/in$^2$ to about 3 g/in$^2$.

Alternatively, as shown in FIG. 9, the second adhesive layer may be applied by a second adhesive dispenser 130' separate from the first adhesive dispenser 130. The second adhesive dispenser 130' may be fixed at a location along a conveyor 105, with the bag b being moved into alignment with the second adhesive dispenser for application of the second adhesive layer. Alternatively, the second adhesive dispenser may be movable to align with a stationary fixtured bag (not shown). The second adhesive dispenser 130' may utilize a number of different adhesive dispensing arrangements, including, for example, the two sprayer arrangement described above and shown in FIG. 10, with the first sprayer applying liquid adhesive to the interior sidewall portion of the bag, and the second sprayer applying liquid adhesive to the interior bottom portion of the bag. While application of the first and second adhesive layers may be performed in substantially the same manner, in other embodiments, the second adhesive dispenser may be configured to apply a different amount of liquid adhesive than the first adhesive dispenser, or to vary other parameters in the application of the second adhesive layer, including, for example, temperature, viscosity, dilution, and liquid adhesive composition, as discussed in greater detail above.

A second adhesive layer applied over the embedded particulate, whether applied by the same adhesive dispenser that applies the first adhesive layer or by a second adhesive dispenser, may be formed from multiple applications of liquid adhesive to the interior surface of the bag cavity, similar to the exemplary formation of the first adhesive layer as described in greater detail above. In an exemplary embodiment, a liquid adhesive forming the second adhesive layer is dispensed in two to four applications, with each application dispensing an area density of about 0.25 g/in$^2$ to about 1.5 g/in$^2$ (for a cumulative area density of about about 1 g/in$^2$ to about 3 g/in$^2$). To allow time for an application of the liquid adhesive to affix to the bag coating (e.g., to begin to dry or cure), a time period (e.g., about 1 to 5 seconds) may be provided between liquid adhesive applications to a location on the hag sidewall.

The bag coating system may be configured to apply a second layer of particulate over the second adhesive layer, for example, to retain more particulate than could be retained by embedding the particulate in the limited surface area of the coated packaging substrate, or to apply different additives in separate sequential applications, as described above and shown in the embodiment of FIG. 5. The second layer of particulate may be applied by the same particulate dispenser that supplied the first particulate (e.g., by moving the bag along conveyor 105 back into alignment with the particulate dispenser 140, or by moving the particulate dispenser back into alignment with the bag). While application of the first and second layers of particulate may be performed in substantially the same manner, in other embodiments, the particulate dispenser may be configured to apply a different amount or type(s) of particulate as compared to the first layer of particulate.

Alternatively, as shown in FIG. 9, the second layer of particulate may be applied by a second particulate dispenser 140' separate from the first particulate dispenser 140. The second particulate dispenser 140' may be fixed at a location along a conveyor 105, with the bag b being moved into alignment with the second particulate dispenser for application of the second particulate layer. Alternatively, the second particulate dispenser may be movable to align with a stationary fixtured bag (not shown). The second particulate dispenser 140' may utilize a number of different particulate dispensing arrangements, including, for example, one or more of the particulate spreading augers described above and shown in FIG. 11. While application of the first and second particulate layers may be performed in substantially the same manner, in other embodiments, the second particulate dispenser 140' may be configured to apply a different amount or type(s) of particulate than the first particulate dispenser 140. This second particulate layer may also be covered by an adhesive layer applied by an adhesive dispenser stationed on the conveyor.

In other embodiments, as shown in FIG. 9, the system 100 may include a dispenser 150 for applying a non-particulate additive (e.g., in addition to or instead of particulate additives), such as, for example, liquids and gels, as described above. This non-particulate additive dispenser 150 may be utilized in addition to or instead of the one or more particulate dispensers 140, 140' to apply an item treating additive to an interior surface of the bag. The dispenser may utilize any suitable dispensing mechanism, including, for example, devices for one or more of spraying, brush or sponge application, dipping, rinsing, or flooding. In an exemplary embodiment, the non-particulate additive dispenser 150 may utilize a spraying mechanism, such as, for example, the liquid adhesive spraying mechanisms described above.

When the one or more layers of the bag coating have been applied, the bag may be subjected to a drying or curing operation to solidify the coating on the bag, readying the coated bag for stable storage prior to use. In the exemplary system 100 of FIG. 9, a drying device 160 is positioned on the conveyor 105 for drying a bag b moved into alignment with the drying device. The drying device 160 may be configured to utilize any suitable mechanism for drying or curing a bag coating to solidify or otherwise stabilize the applied coating, including, for example, one or more of heat drying (convection, microwave, infrared radiation, ultraviolet radiation), forced air drying, batch drying, conveyor drying, chemical drying, or freeze drying, applied to either or both of the interior and exterior of the coated bag.

Other embodiments and processes are contemplated by the inventive aspects of the present application. For example, inventive aspects of the present application may be applied to a variety of different containers, packaging components, and other substrates. For example, packaging products utilized in embodiments of the present application may include, for example, any suitable films or other substrates, gas or liquid permeable films, heat-shrinkable or non-shrinkable bags, thermal forming films, vacuum shrink bags, pleated or gusseted bags, wicketed bags, seamless or seamed bags, tubes, rigid containers (e.g., cups, bowls, trays) or containers formed from rigid materials (e.g., plastic, glass, metals), lids, casings, nettings, mesh, parchment, foils (e.g., aluminum, tin), foil papers, chub films, bone coverage films or other materials, biopolymeric films or other materials, biodegradable films or other materials, "active" or "smart" packaging, melamine resin, rice paper, cheesecloth, shrink-wrap, and soaker pads. In still other examples, coatings may additionally or alternatively be applied to non-packaging components, such as, for example, filters, patches (e.g., nicotine patches), or drinking straws.

In another exemplary embodiment of the present application, a bag or other substrate may be provided with a dried or cured adhesive coating configured for later embedding or adhesion of a particulate or other such additive. In such an embodiment, the substrate coating may be moistened to activate the adhesive properties of the adhesive coating, and a particulate or other additive may be applied to the moistened adhesive layer (e.g., using the devices and methods described above). Subsequent re-drying of the adhesive layer causes the embedded or adhered additive to be secured in the substrate coating for future release onto a packaged item, as described above.

Other exemplary embodiments of coated food seasoning bags, and uses for such bags, are described in co-pending U.S. Patent Application Pub. No. 2012/0128836, the entire disclosure of which is incorporated herein by reference.

While various inventive aspects, concepts and features of the inventions may be described and illustrated herein as embodied in combination in the exemplary embodiments, these various aspects, concepts and features may be used in many alternative embodiments, either individually or in various combinations and sub-combinations-thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

We claim:

1. A method of forming a coated bag for pre-treating an item stored in the bag, the method comprising:
    providing a bag having a sidewall extending from a closed bottom end to an open top end and defining an interior surface of a cavity;
    expanding the bag from a flattened condition to an expanded condition;
    inserting at least one adhesive dispenser through the open top end of the bag into the cavity;
    applying an adhesive from the at least one inserted adhesive dispenser to form an adhesive coating on the interior surface of the cavity;
    inserting a particulate dispenser through the open top end of the bag into the cavity;
    discharging a particulate from the inserted particulate dispenser to embed the particulate in the adhesive coating; and
    drying the adhesive coating to retain the embedded particulate on the interior surface of the sidewall;
    wherein the adhesive is a first adhesive and the adhesive coating is a first adhesive coating, the method further comprising applying a second adhesive from the at least one inserted adhesive dispenser to form a second adhesive coating on the embedded particulate, such that the embedded particulate is captured between the first and second adhesive coatings.

2. The method of claim 1, wherein applying the adhesive comprises spraying a liquid adhesive having a viscosity between approximately 6 dPa and approximately 10 dPa.

3. The method of claim 1, wherein applying the adhesive comprises spraying a liquid adhesive at a temperature between approximately 87° F. and approximately 175° F.

4. The method of claim 1, wherein applying the adhesive comprises spraying a liquid adhesive at a pressure between approximately 200 psi and approximately 1300 psi.

5. The method of claim 1, wherein applying the adhesive comprises spraying a liquid adhesive at a flow rate between about 1 g per second and about 2 g per second.

6. The method of claim 1, wherein expanding the bag from the flattened condition to the expanded condition comprises applying suction to an outer surface of the sidewall.

7. The method of claim 1, wherein drying the adhesive coating comprises maintaining the coated bag at a maximum temperature of up to approximately 160° F.

8. The method of claim 1, wherein drying the adhesive coating comprises applying infrared radiation to an exterior surface of the bag.

9. The method of claim 1, wherein discharging the particulate from the inserted particulate dispenser comprises discharging at least one of a seasoning particulate, a coloring particulate, and a preservative particulate.

10. The method of claim 1, wherein the first and second adhesives are substantially the same material.

11. The method of claim 1, wherein the first and second adhesives are applied at substantially the same temperature.

12. The method of claim 1, wherein the first and second adhesives have substantially the same viscosity when applied.

13. The method of claim 1, wherein discharging the particulate comprises discharging a first particulate, the method further comprising discharging a second particulate after applying the second adhesive, such that the second particulate is embedded in the second adhesive coating.

14. The method of claim 13, further comprising applying a third adhesive from the at least one inserted adhesive dispenser after discharging the second particulate to form a third adhesive coating on the second embedded particulate, such that the second embedded particulate is captured between the second and third adhesive coatings.

15. The method of claim 1, wherein the adhesive coating has an area density between approximately 20 mg/in$^2$ and approximately 60 mg/in$^2$.

16. The method of claim 1, wherein discharging the particulate comprises discharging a first particulate, the method further comprising discharging a second particulate after discharging the first particulate to embed the second particulate in the adhesive coating, the second particulate being different from the first particulate.

17. The method of claim 16, wherein the first particulate has an average particle size that is at least 100 times an average particle size of the second particulate, the second particulate being embedded in the adhesive coating in spaces between the embedded first particulate.

18. The method of claim 1, wherein the adhesive comprises an edible adhesive and the particulate comprises an edible particulate.

19. The method of claim 1, wherein applying the adhesive to form the adhesive coating comprises spraying an aerated liquid adhesive to form an adhesive coating having gas bubbles trapped throughout the adhesive coating.

20. The method of claim 1, wherein applying the adhesive to form the adhesive coating comprises spraying an aerated liquid adhesive to form a foamed adhesive coating on the interior surface of the cavity.

21. The method of claim 1, wherein the interior surface has a surface tension between about 30 dynes/cm and about 38 dynes/cm.

* * * * *